United States Patent [19]

Bailey et al.

[11] 4,111,876

[45] Sep. 5, 1978

[54] IMPACT MODIFIERS FOR POLYVINYL CHLORIDE

[75] Inventors: Frederick Eugene Bailey; Joseph Victor Koleske, both of Charleston, W. Va.

[73] Assignee: Union Carbide Corporation, New York, N.Y.

[21] Appl. No.: 671,973

[22] Filed: Mar. 30, 1976

[51] Int. Cl.$^2$ .................. C08L 25/12; C08L 27/06; C08L 25/14; C08L 35/06
[52] U.S. Cl. .................. 260/29.6 RB; 260/45.75 W; 260/876 R; 260/881; 260/898; 260/899; 526/80; 526/87; 526/328; 526/342; 526/347
[58] Field of Search .................. 260/876 R, 881, 885, 260/886, 898, 29.6 RB

[56] References Cited

U.S. PATENT DOCUMENTS

| | | | |
|---|---|---|---|
| 2,420,330 | 5/1947 | Shriver et al. | 526/72 X |
| 3,448,175 | 6/1969 | Doak et al. | 260/880 |
| 3,678,133 | 7/1972 | Ryan | 260/876 R |
| 3,681,475 | 8/1972 | Spilner | 260/876 R |
| 3,804,881 | 4/1974 | Bassett et al. | 526/80 X |

FOREIGN PATENT DOCUMENTS 1,292,226 10/1972 United Kingdom.

*Primary Examiner*—Wilbert J. Briggs, Sr.
*Attorney, Agent, or Firm*—Peter R. Shearer

[57] ABSTRACT

A poly(vinyl chloride) resin composition comprised of an admixture of poly(vinyl chloride) resin and a clear or translucent polymeric material comprised of a non-uniform copolymer comprised of acrylonitrile, styrene and acrylate ester. The clear polymeric ASA material is a good impact modifier for PVC. The admixture contains from 3 to 15 percent by weight, based on the admixture, of the clear polymeric material. The clear polymeric material has a weight ratio of acrylonitrile and styrene acrylonitrile, styrene and acrylate ester which is between about 40 to 60 and about 60 to 40. The PVC resin combination, in dry form, can be conventionally hot processed or fabricated.

The non-uniform polymer is prepared by the process which comprises introducing at least one primary polymerizable feed composition, selected from the group of monomers consisting of styrene, acrylonitrile, acrylate ester, and a mixture of two or more of such monomers, from at least one primary feed source to a polymerization zone, the primary polymerizable feed composition continually varying in compositional content of the polymerizable reactants therein during the continuous introduction; simultaneously adding to the primary feed source at least one different secondary polymerizable feed composition, selected from the group of monomers consisting of styrene, acrylonitrile, acrylate ester and a mixture of two or more of such monomers, from at least one secondary feed source so as to continually change the compositional content of the polymerizable reactants of the primary polymerizable feed composition in the primary feed source; and continuously polymerizing the primary polymerization feed composition introduced to the polymerization zone until the desired polymerizable has been achieved, the primary polymerizable feed composition being different from the secondary polymerizable feed composition.

6 Claims, 3 Drawing Figures

IMPACT MODIFIERS FOR POLYVINYL CHLORIDE

BACKGROUND OF THIS INVENTION

1. Field of This Invention

This invention relates to impact modifiers for PVC polymer compositions and PVC polymer compositions containing such impact modifiers.

2. Prior Art

While ABS is a styrene-acrylonitrile polymer matrix with a butadiene or butadiene copolymer elastomer component, ASA is a styrene-acrylonitrile matrix containing a polyacrylate elastomer. Both ABS and commercially available ASA materials are opaque, yellowish white molding materials. As to known acrylonitrile-styrene-acrylate ester thermoplastic compositions, see page 32 of *Materials Guide,* published by British Plastics, (Aug. 1971).

With the substitution of acrylate based elastomer for a butadiene based one, ASA plastics are claimed to have significantly higher photochemical, i.e., weathering and oxidative, resistance than ABS and, therefore, find major use outdoors. Published data, however, suggest, while ASA plastics do have higher photochemical stability, that ASA plastic show up to 8 to 10 times the exposure before loss of impact resistance is noted — failure thereafter is precipitous. In ABS systems, due to the butadiene moieties present, degradation and cross-linking reaction occur simultaneously, giving rise to an initial and continuing decline in impact resistance and growing yellowing with time.

Attention is drawn to U.S. Pat. No. 3,448,175, Belgian Pat. No. 775,373, U.S. Pat. No. 3,681,475, Japanese Pat. No. 4,709,993 and U.S. Pat. No. 3,678,133.

BROAD DESCRIPTION OF THIS INVENTION

An object of this invention is to provide clear or translucent acrylonitrile-styrene-acrylate ester impact modifiers for poly(vinyl chloride) resins (PVC). A further object of this invention is to provide a PVC composition containing such clear or translucent acrylonitrile-styrene-acrylate ester impact modifiers. Other objects and advantages of this invention are set out herein or are obvious to one ordinarily skilled in the art herefrom.

The compositions of this invention achieve the objects and advantages of this invention.

This invention involves a clear or translucent polymeric material comprised of a non-uniform copolymer comprised of acrylonitrile, styrene and acrylate ester. The polymeric material has a weight ratio of acrylonitrile and styrene to acrylonitrile, styrene and acrylate ester which is between about 40 to 60 and about 60 to 40. The polymeric material is a good impact modifier for poly(vinyl chloride) resin compositions.

The non-uniform ASA polymeric material is prepared by the improved process which comprises: introducing at least one primary polymerizable feed composition, selected from the group of monomers consisting of styrene, acrylonitrile acrylate ester, and a mixture of two or more of such monomers, from at least one primary feed source to a polymerization zone, the primary polymerizable feed composition continually varying in compositional content of the polymerizable reactants therein during the continuous introductions; simultaneously adding to the primary feed source at least one different secondary polymerizable feed composition, selected from the group of monomers consisting of styrene, acrylonitrile, acrylate ester and a mixture of two or more of such monomers, from at least one secondary feed source so as to continually change the compositional content of the polymerizable reactants of the primary polymerizable feed composition in the primary feed source; and continuously polymerizing the primary polymerizable feed composition introduced to the polymerization zone until desired polymerization has been achieved. The primary polymerizable feed composition being different from the secondary polymerizable feed composition. The polymerization is preferably conducted under monomer starved conditions.

The weight ratio of said acrylonitrile to said styrene is preferably about 1 to 3 in the clear or transparent ASA polymeric material. The clear or translucent ASA polymeric material can be admixed with the PVC in latex or dry powder form. When the ASA material is used in latex form, the PVC is preferably used in latex form. Such a latex is placed in dry form by spray drying the latex admixture.

This invention also includes a poly(vinyl chloride) resin composition comprised of an admixture of poly(vinyl chloride) resin and the clear or translucent polymeric material comprised of the non-uniform copolymer of this invention. The admixture contains from 0.5 to 15, preferably 3 to 15, percent by weight, based on the total weight of the admixture, of the clear or translucent polymeric material. The clear or translucent polymeric material, at the lower levels of such quantitative range, can be used as a processing aid; this results in considerable energy savings when processing PVC. The clear or translucent polymeric material has a weight ratio of acrylonitrile and styrene to acrylonitrile, styrene and acrylate ester which is between about 40 to 60 and about 60 to 40.

The admixture can also contain a stabilizer, a pigment and at least one other conventional poly(vinyl chloride) resin composition additive. Preferably the weight ratio of acrylonitrile to styrene in the clear polymeric ASA material is about 1 to 3. The poly(vinyl chloride) resin composition of this invention containing the clear or translucent ASA polymeric material the poly(vinyl chloride) resin in a latex admixture or in dry form, e.g., a powder.

The dry poly(vinyl chloride) resin composition of this invention can be hot processed or fabricated to achieve ASA-impact modified PVC final products.

The acrylonitrile-styrene-acrylate ester terpolymers (ASA) of this invention are excellent impact modifiers for poly(vinyl chloride) compositions. The acrylonitrile-styrene-acrylate ester elastomer compositions of this invention impart impact resistance to poly(vinyl chloride) materials. Suprisingly the ASA polymers of this invention do not improve the impact resistance of polystyrene or SAN materials.

The ASA (acrylonitrile-styrene-acrylate ester elastomer) compositions of this invention are prepared via the improved process technology and are effective modifiers for a range of commercial poly(vinyl chloride) resins in increasing the impact resistance thereof. The ASA materials of this invention are effective impact modifiers when present in the resulting PVC composition in the concentration ranges of about 3 to 15 percent by weight and the ASA compositions have a hard matrix (acrylonitrile-styrene) to elastomer segment (acrylonitrile-styrene-acrylate ester) ratio by weight in the range between about 40 to 60 and 60 to 40.

The acrylonitrile-styrene-acrylate ester elastomer compositions of this invention not only raise the impact resistance of PVC, but also lower the brittle temperature. Both effects are observed without any appreciable lowering of the heat distortion temperature (effective upper use temperatures) of the particular grade of PVC selected for modification.

The improved process for producing the improved impact modifiers used in our compositions is disclosed in U.S. Pat. No. 3,804,881. The preferred procedure is that wherein there is no change in the compositional content of the feeds to the reactor for an initial portion and terminal portion of the reaction, as shown in Example 1. This process or technique allows the preparation of broad composition distribution copolymers in a highly controlled and reproducible way.

DETAILED DESCRIPTION OF THIS INVENTION

As used herein, the term poly(vinyl chloride) includes PVC compositions that contain up to 20 percent by weight of at least one other comonomer. Examples of such comonomers include ethylene, vinyl acetate, cetyl vinyl ether and propylene. The best results are apparently obtained when PVC homopolymer is used.

Figure 1:
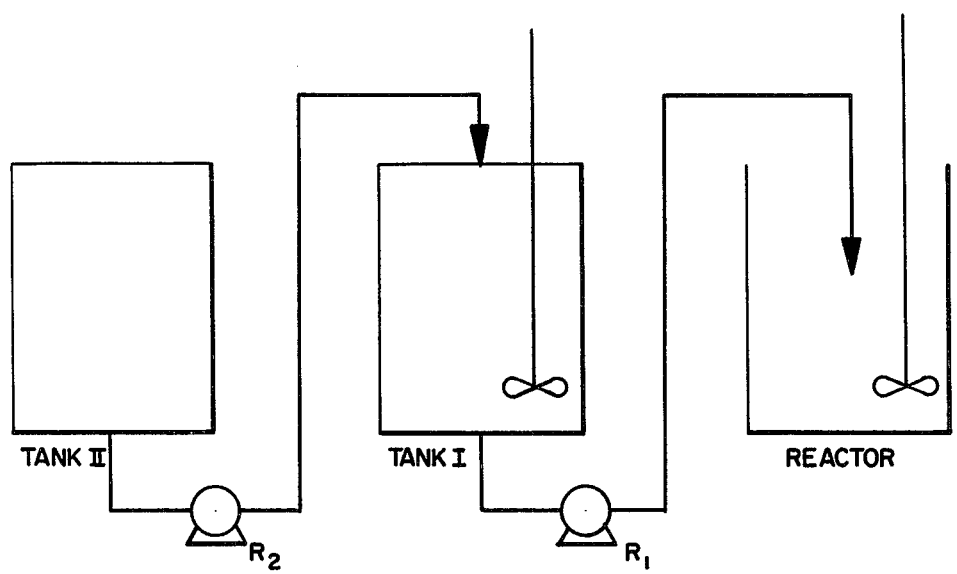
FIG. 1 is a schematic of a typical apparatus arrangement.

FIG. 1 sets out a schematic of apparatus to achieve the improved polymerization process used in this invention. The monomer mixing and feed arrangement has Tank II, Tank I, and the Reactor in series.

Any of the known acrylate esters can be used. While the preferred acrylate ester is 2-ethylhexyl acrylate, other lower alkyl acrylates having 2 to 12, preferably 4 to 10, carbon atoms in the alkyl group, such as, ethyl acrylate, isopropyl acrylate, propyl acrylate, n-butyl acetate, hexyl acrylate, dodecyl acrylate, 3-methyl-1-butyl acrylate, isobutyl acrylate and isodecyl acrylate, can be used.

Styrene and acrylonitrile provide the hard matrix component and the acrylonitrile, styrene and acrylate ester provides the rubbery or elastomeric segment. Crosslinkers, such as, neopentyl glycol diacrylate (preferably), pentaerythritol triacrylate, diethyl glycol diacrylate, propylene glycol diacrylate, trimethylol propane triacrylate and the diacrylate of 3-hydroxy-2,2-dimethyl propyl, 3-hydroxy-2,2-dimethylpropionate, are preferably used in the one to four percent by weight level (based on the total monomers), preferably at three percent by weight, to crosslink the rubbery phase.

It appears that with respect to building impact in a PVC composition, with an ASA material of this invention, acrylonitrile is a positive factor in the hard matrix of the ASA. Best results are obtained with an acrylonitrile to styrene weight ratio in the range of 1 to 3. Further the hard matrix AS to elastomer ASA weight ratio in the improved material should be in the range of between 40 to 60 and 60 to 40.

The impact modifier of this invention can be produced by solution, dispersion or emulsion polymerization processes. In this application, they were produced as a latex and dispersed with the base polymers (PVC) also in latex or suspension form — the combination can be recovered by spray drying or other suitable means. Alternatively, the impact modifier can be recovered alone in powder form and then blended with the base polymers (PVC) in powder form (along with stabilizers pigments and other conventional PVC composition additives) prior to hot processing or fabrication (which achieves rigid polyvinyl chloride compositions). Since the compositions are recovered in the form of a powder it is preferable to dry blend the modifier with the PVC along with other additives such as stabilizers, colorants and the like, thus avoiding a second hot-milling operation to incorporate the impact modifier.

The ASA compositions of this invention are clear.

The ASA compositions of this invention which contain 40 to 50 weight percent of 2-ethylhexyl acrylate are quite flexible.

The ASA compositions of this invention are superior PVC impact modifiers than the much softer, more flexible compositions of styrene-acrylate elastomer alone. Further, hard matrix AS to elastomer ASA ratios in the range of 50:50 to 60:40 are superior, and the highest impacts are obtained in the range of 7 to 10 parts of ASA. Considerably higher impact strength is obtained with 2-ethylhexyl acrylate than with n-butyl acrylate in the elastomer phase (lightly crosslinked through about three percent of neopentyl glycol diacrylate as a comonomer). In cases in which the matrix to elastomer ratio is less than 50:50, the composition became sufficiently soft that recovery problems occur. The ASA materials of this invention are multiphase systems of ASA elastomer contained in a styrene-acrylonitrile matrix. The ASA compositions of this invention can be recovered as hard, dry powders or chips, which can be molded to clear, semi-flexible plaques.

The ASA compositions of this invention when used as impact modifiers for PVC in the 3 to 15 weight percent range are highly effective in raising the Izod impact of PVC without appreciable sacrifice in heat distortion temperature. Molded bars (one-eighth inch thick) have the typical amber color and are only slightly hazy.

The compositions of this invention increase the impact resistance of PVC compositions.

In this application the following test methods were used:
ASTM-D638-72 for elongation, tensile strength and stiffness.
ASTM-D1822-68, for Izod impact.
ASTM-D648-72, for heat distortion.
ASTM-D746-73, for brittle temperature.

U.S. Pat. No. 3,804,881 discloses an improved technique for producing non-uniform copolymers that broadly involves continuously introducing at least one primary polymerizable feed composition from at least one primary feed source to a polymerization zone, which primary polymerizable feed composition is continually varying in compositional content of the reactants therein, while simultaneously adding to at least one primary polymerizable feed composition in at least one primary feed source at least one different secondary polymerizable feed composition from at least one secondary feed source so as to continually change the compositional content of the reactants of the primary polymerizable feed composition in the primary feed source, and polymerizing the primary polymerizable feed composition that has been introduced into the polymerization zone.

This invention primarily involves (i) acrylate ester, (ii) acrylonitrile and (iii) styrene starting materials, and preferably a monomer-starved system, the following discussion of the improved process of technique is generalized re starting materials since this invention can be applied to other starting materials. The pertinent portions of U.S. Pat. No. 3,804,881 are incorporated herein by reference.

In the improved process the concentrations of the polymerizable reactants in the primary polymerizable feed composition are continually changing during the introduction of the primary polymerizable feed mixture to the polymerization zone by the simultaneous addition of a different secondary polymerizable feed mixture to the primary polymerizable feed mixture. The distinguishing feature of the improved process is the introduction of primary polymerizable feed mixture to the polymerization zone from a primary feed source while simultaneously introducing at least one different secondary polymerization feed composition from a secondary feed source to the primary polymerizable feed composition in the primary feed source.

The polymerization zone is any reactor, properly equipped, that can be used for the production of polymers. The different types of reactors and their suitability for a particular polymerization reaction are well known to those skilled in the art and do not require elaboration herein. Connecting to the polymerization reactor is at least one primary feed source. The term primary feed source defines one or more tanks or sources of polymerizable reactants feeding directly into the polymerization zone or reactor, for example, it can be an in-line mixer or a tank. The primary feed source is equipped with efficient mixing means to assure adequate mixing of the contents thereof. Connecting, in turn, to any of the primary feed sources is at least one secondary feed source. The term secondary feed source defines one or more tanks or sources of polymerizable reactants feeding to any of the primary feed sources. There can be one or more secondary feed sources with all of the secondary feed sources feeding directly into the primary feed source, or one or more of the secondary feed sources can fed in series to another secondary feed source and thoroughly mix therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The improved process configurations that can be engineered are many; however, in all instances there must be a polymerization zone or reactor connected to at least one primary feed source or tank equipped with mixing means which in turn is connected to at least one secondary feed source or tank which secondary feed sources (when more than one thereof is used) can all or in part feed directly into one or more of the primary feed sources or tanks or can feed in series into one another and ultimtely feed into the primary feed source or tank.

The primary polymerizable feed composition is the mixture of reactants present at any particular time in the primary feed source or tank. This mixture can contain the polymerizable reactants alone or it can include any additive which will not have a deleterious effect on the polymerizable reactions (for example, diluents or solvents, colorants, dispersion or emulsion agents, antioxidants, stabilizers, chain transfer agents, crosslinkers, initiators, one of the components of a redox catalyst system, and the like). The compositional content of the primary polymerizable feed composition is continually changing as secondary polymerizable feed composition is fed into and mixed with it. By the term compositional content is meant the content or concentration in the polymerizable feed composition of each reactant therein. As becomes apparent from this teaching and description the simultaneous feeding of primary polymerizable feed composition from the primary feed source to the polymerization zone and feeding of a different secondary polymerizable feed composition from the secondary feed source to the primary feed source will result in a continual change of the content or concentration of each reactant present in the primary polymerizable feed composition or in the compositional content of the primary polymerizable feed composition. This continual change in compositional content can also occur in the secondary polymerizable feed composition when more than one thereof is being used and they are feeding in series into each other before ultimately feeding into the primary polymerizable feed composition.

The secondary polymerizable feed composition is the mixture of reactants present at any particular time in any one or more of the secondary feed sources or tanks and can contain the same types of additives that were previously indicated could be present in the primary polymerizable feed composition. (It should be remembered, however, that if one of the polymerizable feed mixtures contains one of the components of a redox catalyst system that the other such mixture cannot contain the other component thereof otherwise polymerization will occur in the feed tanks before the polymerizable reactants are introduced into the polymerization zone.)

In the improved process there are used primary polymerizable feed compositions and secondary polymerizable feed compositions. The primary polymerizable feed composition can initially contain a single polymerizable reactant or it can initially contain a plurality of polymerizable reactants; the same is true for the initial content of the secondary polymerizable feed composition. However, when the primary polymerizable feed composition is a single reactant the secondary polymerizable feed composition cannot be solely that same single reactant, it can be a different single reactant or a mixture of a plurality of reactants that can include that same reactant in the mixture. Likewise, when the primary polymerizable feed composition is a mixture of a plurality of reactants the secondary polymerizable feed composition cannot be that same mixture having the same concentrations for each reactant, it can be a single reactant or it can be a different mixture of the same reactants but at different initial concentrations of the reactants. The important and ever present factor is that the initial compositional contents of the primary polymerizable feed composition and of the secondary polymerizable feed composition are always different, they are not initially identical in make-up of polymerizable reactants.

As a result of the initial differences in the compositional contents of the primary and secondary polymerizable feed compositions and of the simultaneous addition of secondary polymerizable feed composition to primary polymerizable feed composition while the primary polymerizable feed composition is introduced into the polymerization zone there is a continual variation in the compositional content of the primary polymerizable feed composition. Hence, any portion of the primary polymerizable feed composition entering the polymerization zone is at all times different from the portion that preceded it and the portion that succeeds it. Consequently, the composition of the polymer produced in the reactor during the addition is likewise continuously changing and reflects the composition of the primary polymerizable feed composition entering the polymerization zone. In a rapid polymerization reaction, like the preferred one at bar, one wherein there is essentially instantaneous reaction of the monomers when they are introduced to the polymerization zone, one has what is known as a monomer-starved system. Or, one may have so-called monomer rich system, i.e., a system in which there is some time delay between introduction of the reactants to the polymerization zone and essentially complete polymerization of the reactants. Thus, in the monomer-starved system the polymer produced by any one period of time differs in constitutional content from the polymer produced prior to that period of time or subsequent to that period of time. However, in the monomer rich system the composition of the polymer formed at any instant is dependent upon the concentration of each monomer in the polymerization zone and the respective reactivity of each monomer present therein in relation to the other monomers. There are thus produced certain non-uniform polymer compositions of polymer molecules having infinite variation in molecular structures. By the term infinite variation in molecular structures is meant the mixture of the infinite number of different polymers that is produced in the polymerization zone by the improved process. By the term non-uniform is meant that polymer molecules formed at any one time during the polymerization reaction are not the same as polymer molecules formed at any other time.

The improved process can be described in its simplest manner by a reaction involving a single primary feed source initially containing a single polymerizable reactant and a single secondary feed source containing a single different polymerizable reactant. The contents in the primary feed source or tank at any time during the process are known as the primary polymerizable feed composition and the contents of the secondary feed source or tank are known as the secondary polymerizable feed composition. Secondary feed source feeds into primary feed source by suitable lines and pumps; primary feed source is equipped with an efficient stirrer or mixer and feeds into the polymerization zone. At the start of the polymerization the flow of primary polymerizable feed composition from the primary feed source to the polymerization zone is commenced at a predetermined rate, simultaneously the flow of secondary polymerizable feed composition from secondary feed source to the primary feed source is initiated and this rate of flow can be the same as or different from the rate of flow from the primary feed source to the polymerization zone. As the secondary polymerizable feed composition enters the primary feed source it is thoroughly mixed with the contents thereof resulting in a continual change in the compositional content of the primary polymerizable feed composition. This continually changing primary polymerizable feed composition is simultaneously and continuously entering the polymerization zone and the polymer produced therein is varied in accord with the compositional content of the reactants mixture in the polymerization zone. As is apparent from the prior description either or both of the primary secondary feed sources can contain more than one polymerization reactant.

The variation in the engineering arrangements of the primary and secondary feed sources are innumerable and no attempt will be made to set forth each specific tank configuration or arrangement possible; these can readily be devised by skilled individuals at will for the purpose of obtaining maximum operational efficiency or for the purpose of obtaining products having certain desired properties. In the preceding paragraph there has been outlined a simple arrangement employing a single primary feed source and a single secondary feed source. Slightly more complex arrangements would be those wherein there was a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding directly into the primary feed source. Other arrangements would be those wherein there was a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources all feeding in parallel directly into only one of the primary feed sources, or a plurality of secondary feed sources could be feeding in series into only one of the primary feed sources, or the plurality of secondary feed sources can be feeding in series into more than one of the primary feed sources. When a plurality of secondary feed sources is used they can be used in any combination desired, all can be used in series, some can be used in series while others are not, or none need be used in series with all of them being added directly to the primary feed source. In all instances the primary feed sources feed the primary polymerizable feed composition to the polymerization zone; the secondary feed sources feed the secondary polymerizable feed composition directly to the primary feed source or in series to another secondary feed source with the reactants therein ultimately terminating in the primary feed source before entering the polymerization zone. During these movements of reactants from one feed source to another there is a resultant continual change in the compositional content of the contents of the tank to which polymerizable reactant is added and the contents of the tanks are agitated to obtain efficient mixing of the contents therein. One can also vary the process by having periods of time at the start, during or near the end of the reaction wherein there is feeding of primary polymerizable feed composition from the primary feed source into the polymerization reactor without any simultaneous feeding of secondary polymerization feed composition into the primary feed source or tank for a selected period of time. In addition, the flow rates between feed tanks or polymerization zones can be varied at will at any time during the polymerization reaction. One can also, with suitable known means, using variable feed valves, feed polymerizable reactants from a plurality of secondary feed sources through an in-line mixer which serves as the primary feed source wherein the primary polymerizable feed composition is produced. The in-line mixer then feeds the primary polymerizable feed composition directly into the polymerization zone.

In the improved process non-uniform polymers are produced in a controlled manner. By the term non-uniform polymer is meant a polymer composition produced by the reaction of a polymerizable reactants mixture which, during a portion of the polymerization period, is continually changing in compositional content. In the case at bar, the polymeric compositions of (i) acrylonitrile, (ii) acrylate ester, and (iii) styrene unexpectedly have good clarity, (i.e., they are clear or translucent) and are excellent impact modifiers for poly(vinyl chloride) resins.

The concentrations of a particular polymerizable reactant initially present in the primary polymerizable feed composition or initially present in the secondary polymerizable feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each reactant in the polymer or to obtain a particular property or characteristic in the polymer. The rate of flow from secondary feed sources and from primary feed sources can also be varied at the will of the skilled individual and do not require elaborate discussion herein except that they are preferably those for a monomer-starved system in the case at bar. The process employs the temperature and pressure conditions known to be suitable for the reactants employed.

The polymerizable feed composition can contain in the usual known amounts, dispersion aids, emulsifiers, colorants, activators, catalysts, and other additives conventionally used in polymerization reactions, all of which are known as is their use. Any of the known dispersion agents can be used at the conventional concentrations, hydroxyethyl cellulose, carboxymethyl cellulose, poly(vinyl alcohol), methyl cellulose, sulfated cellulose, and the like. Any of the known emulsifiers can be used at a total concentration preferably below one percent by weight based on the total weight of polymerizable reactants charged. Among the useful emulsifying agents there are included soaps, sulfonated alkylbenzenes, alkylphenoxyethyl sulfonates, sodium lauryl sulfonate, salts of long chain amines, salts of long chain carboxylic or sulfonic acids, allylphenol ethoxylates, linear alcohol ethoxylates, or any other emulsifying agent.

The particular catalyst to be used depends on the polymerizable reactants. A free radical initiator is used in the monomer-starved system at bar. The catalysts themselves are not the instant invention and as is recognized in the art, the particular catalyst depends on the type of polymerization being carried out and the reactants used. The catalysts are employed in the conventional manner at the conventional concentrations. Illustrative of suitable free radicals initiators are hydrogen peroxide, paracetic acid, t-butyl hydroperoxide, di-t-butyl peroxide, dibenzoyl peroxide, benzoyl peroxide, benzoyl hydroperoxide, 2,4-dichlorobenzoyl peroxide, 2,5-dimethyl-2,5-bis(hydroperoxy) hexane, perbenzoic acid, t-butyl peroxypivalate, t-butyl peracetate, azo-bis-ixobutyronitrile ammonium persulfate, potassium persulfate, sodium persulfate, sodium perphosphate and the like.

The improved process can be used to carry out emulsion polymerization reactions, suspension, polymerization reactions, solution polymerization reactions and bulk polymerization reactions, using the known basic concepts for these reactions but carrying out the reactions according to the procedures herein taught. The basic concepts for each process are so well known that they do not require any further detailed description herein and when coupled with the teachings of the instant invention one skilled in the art of polymer production has a clear understanding of the instant invention. The solid polymers can be recovered by conventional means.

The following examples serve to further illustrate this invention. Parts and percentages are by weight (throughout this specification) unless otherwise specified.

EXAMPLE 1

The reactor was charged with 400 grams of water, 3.0 grams of Aerosol OT and 1.25 grams of ammonium persulfate. The reaction temperature was 80° C.

The tank and reactor arrangement is schematically shown in FIG. 1.

In Stage 1 for the production of the hard matrix, Tank II contained 75 grams of styrene and 25 grams of acrylonitrile. Tank I contained 100 grams of 2-ethylhexyl acrylate and 3 grams of neopentyl glycol diacrylate. The contents of Tank I were pumped into the Reactor at a rate of 5 ml per minute for 18 minutes. After this with the rate of pumping to the Reactor continued, Tank II was pumped into Tank I at a rate of 1.67 ml per minute and pumping was continued until both tanks were emptied to the Reactor.

In Stage II for the production of the elastomer segment, Tank II contained 75 grams of styrene and 25 grams of acrylonitrile. Tank I contained 100 grams of 2-ethylhexyl acrylate and 3 grams of neopentyl glycol diacrylate. The contents of Tank I was again pumped into the Reactor at a rate of 3 ml per minute. When Tank I was effectively empty, there remained 9 ml of the styrene/acrylonitrile in Tank II, which was fed with continued pumping at 3 ml per minute to the Reactor.

Polymer was recovered from the latex produced in this emulsion polymerization coagulation. The latex was diluted with hot water containing some calcium chloride. The "broken" latex is filtered and the precipitated polymer recovered. The precipitated polymer was washed twice with water and once with isopropanol, and dried in a circulating air oven at 85° to 90° C.

The dry granular polymer recovered had 50 percent of a hard matrix having a 75 to 25 ratio of styrene to acrylonitrile and 50 percent of an elastomeric segment of 2-ethylhexyl acrylate, acrylonitrile and styrene, plus 3 percent of neopentyl glycol diacrylate (based on the acrylate). It was then molded as a plaque in a heated press at 160° C. and 100 psi. The plaque was clear and was found to have the following properties:

| | |
|---|---|
| Room Temperature Stiffness | 60,000 psi |
| Tensile at Break | 2,200 psi |
| % Elongation at Break | 170 |
| % Elongation at Yield | 8 |
| ASTM Brittle Temperature | −26° C. |

The polymer was termed polymer composition no. 1.

Figure 2:
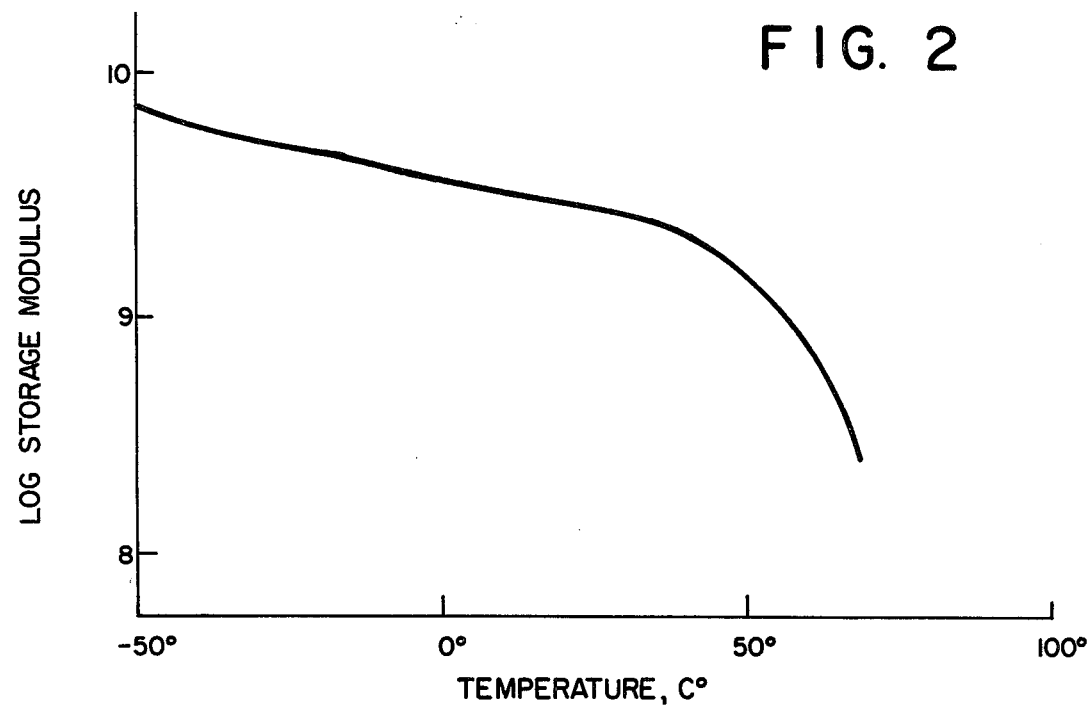
FIG. 2 is a graph of log storage modulus of polymer composition no. 1.
Figure 3:
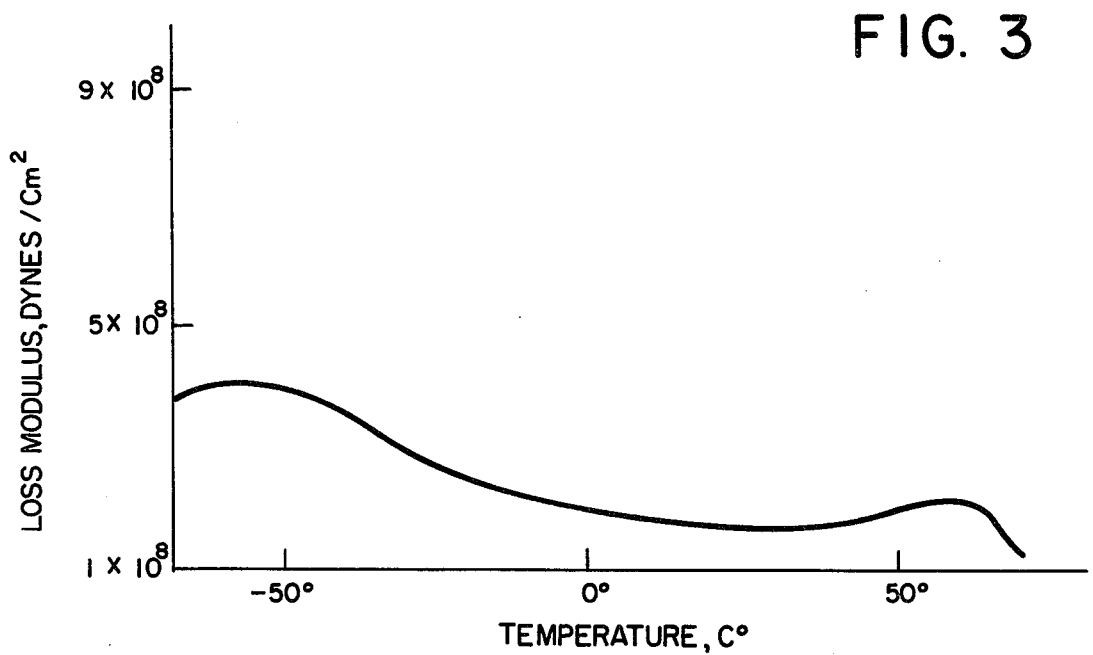
FIG. 3 is a graph of loss modulus of polymer composition no. 1.

Polymer composition no. 1 (in plaque form) was further tested. Polymer composition no. 1 was found to have mechanical transitions in the range of 50° to 70° C., a room temperature stiffness of 60,000 psi, a tensile strength at break of 2,200 psi, an elongation at break of 170 percent, an elongation at yield of 8 percent, a yield occurring at 2,000 psi and an ASTM brittle temperature of −20° C. Polymer composition no. 1 was clear. FIG. 2 sets out a curve of the log storage modulus versus temperature for polymer composition no. 1. FIG. 3 sets out a curve of the loss modulus versus temperature for polymer composition no. 1.

EXAMPLE 2

Polymer composition No. 1 was tested as an impact modifier for poly(vinyl chloride) against unmodified poly (vinyl chloride) and a composition of PVC containing a commercially available modifier. In these tests, the poly (vinyl chloride) used was a vinyl chloride homopolymer with an inherent viscosity (0.2 grams of resin in 100 ml of cyclohexanone at 30° C.) in the range of 0.95 to 1.02.

Five parts by weight of polymer composition no. 1, 45 parts of the same vinyl chloride homopolymer and 0.75 parts of Van Stay HT (a complex barium-cadmium salt used as a PVC stabilizer) were milled together on a two-roll mill at 160° C. for 5 minutes. The milled stock was then molded into one-eighth inch thick bars for Izod Impact testing. The bars were molded at 180° C. and 600 psi. The Izod Impact value was measured to be 4.84 ft. lbs./in.$^2$ In replicate determinations, ASTM heat distortion temperature of this material was determined to be 71° C. at 264 psi.

In a similar experiment, 3.75 grams of polymer composition no. 1, 75 grams of the same vinyl chloride homopolymer and 1.12 grams of Van Stay HT were milled together for 5 minutes at 160° C. On the mill, fluxing, banding, roll release and hot strength were all judged to be good. One-eighth inch thick bars were molded for 5 minutes at 180° C. and 1500 psi. The Izod Impact value in two replicate determinations was 2.77 and 2.90 ft. lbs./in.$^2$, respectively. In replicate determination, the ASTM heat distortion temperature of this material was 71° C. at 269 psi.

In another similar experiment, 11.25 grams of polymer composition no. 1, 75 grams of the same vinyl chloride homopolymer and 1.12 grams of Van Stay HT were milled together on a two-roll mill for 7 minutes at 160° C. On the mill, fluxing, banding, roll release and hot strength were judged to be good. One-eighth inch thick bars were molded for Izod Impact testing at 180° C. and 1500 psi for 5 minutes. The Izod Impact value in two replicate determinations was 2.85 and 2.50 ft. lbs./in.$^2$, respectively. The ASTM heat distortion temperature (at 264 psi) for this composition in two replicate determinations was 67° and 70° C., respectively.

For comparison, the unmodified vinyl chloride homopolymer was milled with 1.5 by weight of Van Stay HT for 5 minutes at 160° C. One-eighth inch thick bars for Izod Impact testing were molded from this milled stock at 180° C. and 2000 psi. In replicate determinations, the Izod Impact value was measured to be 0.87 and 1.17 ft. lbs./ in.$^2$, respectively. This composition had an ASTM heat distortion temperature (at 264 psi) of 73° C.

For further comparison, a commercially sold modifier (Acryloid KM229, Rohm and Haas Company), 75 grams of the same vinyl chloride homopolymer and 1.12 grams of Van Stay HT were milled together on a two-roll mill for 7 minutes at 160° C. One-eighth inch thick bars for Izod Imapct testings were molded from this milled stock for 5 minutes at 1500 psi and 180° C. In replicate determinations, the Izod Impact value was 2.65 and 2.63 ft. lbs./in.$^2$, respectively. The heat distortion temperature by the ASTM method (at 264 psi) was 75° C.

For a still further comparison, a PVC impact modifier which was a graft terpolymer of methyl methacrylate on butylacrylate/butadiene with a composition of 63 parts of butyl acrylate/butadiene, 7 parts of butadiene and 30 parts of methyl methacrylate was used. Milled stock was prepared from 7.5 grams of the defined impact modifier, 75 grams of the same vinyl chloride homopolymer, and 1.12 grams of Van Stay HT by milling on a two-roll mill for 7 minutes at 160° C. One-eight inch thick bars were molded for Izod Impact testing for 5 minutes at 180° C. and 1800 psi. In replicate measurements, the Izod Impact value was 1.49 and 1.15 ft. lbs./in$^2$, respectively. The ASTM distortion temperature for this composition (at 264 psi) was 71° C.

EXAMPLE 3

The procedure used was similar to that used in Example 1. The Reactor was charged with 500 grams of water, 3.75 grams of the dioctyl ester of sulfosuccinic acid and 1.56 grams of ammonium persulfate. The Reactor temperature was 80° C.

In Stage 1, Tank II contained 75 grams of styrene and 25 grams of acrylonitrile. Tank I contained 125 grams of 2-ethylhexyl acrylate and 3.75 grams of neopentyl glycol diacrylate. The contents of Tank I were fed, using a micrometering pump, to the Reactor at a rate of 5 ml per minute until 25 grams had been fed. At this point, while this feed was continued, Tank II was fed to Tank I at a pumping rate of 1.67 ml per minute. When the tanks were emptied, the tanks were refilled. Tank II was refilled with 75 grams of styrene and 25 grams of acrylonitrile. Tank I was refilled with 100 grams of 2-ethylhexyl acrylate and 3 grams of neopentyl glycol diacrylate. The pumping from both tanks continued at a rate of 5 ml/minute from Tank I to the Reactor and of 3 ml per minute from Tank II to Tank I. After both tanks emptied, a charge of 56.2 grams of styrene and 18.8 grams of acrylonitrile was pumped to the Reactor at a rate of 3 ml per minute. Polymerization was essentially complete. The resin composition was recovered by coagulation, filtered, and after washed and dried at 85° to 90° C. in a circulating air oven. The recovered, dry polymer composition had 55 percent of a hard matrix having a 75 to 25 ratio of styrene to acrylonitrile and 45 percent of an elastomeric segment of 2-ethylhexyl acrylate, acrylonitrile and styrene, plus 3 percent of neopentyl glycol diacrylate. It was molded at 160° C. and 1000 psi to give a clear, 10-mil thick plaque.

The polymer was termed polymer composition no. 5.

The mechanical spectrum of polymer composition no. 5 was determined using a torsion pendulum apparatus [as described in J. D. Ferry, "Viscoelastic Properties of Polymers," John Wiley and Sons (New York), 1961, p. 118.], which permits determination of both the storage modulus and the loss modulus of the material as a function of temperature. The results are given in Table I.

TABLE I

| Temperature, ° C. | Storage Modulus, dynes/cm.$^2$ | Loss Modulus, dynes/cm.$^2$ |
|---|---|---|
| −90° | 8.67 × 10$^9$ | 2.96 × 10$^8$ |
| −80° | 8.36 × 10$^9$ | 3.23 × 10$^8$ |
| −70° | 8.03 × 10$^9$ | 3.22 × 10$^8$ |
| −60° | 7.78 × 10$^9$ | 3.02 × 10$^8$ |
| −50° | 7.49 × 10$^9$ | 2.80 × 10$^8$ |
| −40° | 7.27 × 10$^9$ | 2.75 × 10$^8$ |
| −30° | 6.77 × 10$^9$ | 3.07 × 10$^8$ |

TABLE I-continued

| Temperature, °C. | Storage Modulus, dynes/cm.$^2$ | Loss Modulus, dynes/cm.$^2$ |
| --- | --- | --- |
| −20° | $6.10 \times 10^9$ | $3.46 \times 10^8$ |
| −10° | $5.52 \times 10^9$ | $3.12 \times 10^8$ |
| 0.0° | $4.72 \times 10^9$ | $3.04 \times 10^8$ |
| 10.0° | $3.97 \times 10^9$ | $3.31 \times 10^8$ |
| 20.0° | $3.30 \times 10^9$ | $3.27 \times 10^8$ |
| 30.0° | $2.23 \times 10^9$ | $3.54 \times 10^8$ |
| 50.0° | $3.73 \times 10^8$ | $2.27 \times 10^8$ |
| 70.0° | $9.89 \times 10^6$ | $5.20 \times 10^6$ |
| 80.0° | $9.38 \times 10^6$ | $2.76 \times 10^6$ |

EXAMPLE 4

Polymer composition no. 5 was compounded on a two-roll mill for 7 minutes at 160° C. Fluxing, banding, roll release and hot strength were judged to be good. The compound mill stock produced contained 7.5 grams of polymer composition no. 5, 75 grams of the same vinyl chloride homopolymer used in Example 2 and 1.12 grams of Van Stay HT. From this mill stock, one-eighth thick bars were molded for 5 minutes at 180° C. and 1500 psi for Izod Impact determination. In replicate measurements, the Izod Impact values on this composition were 3.99 and 5.73 ft. lbs./in.$^2$, respectively. The 264 psi ASTM heat distortion temperature of this composition was determined to be 71° C.

EXAMPLE 5

The procedure used was similar to that used in Example 1. The Reactor was charged with 600 grams of water, 4.5 grams of Aerosol OT and 1.88 grams of ammonium persulfate. The reaction temperature was 80° C.

In Stage I, step 1, that is, from Tank I to the Reactor, there was pumped using micrometering pump a mixture of 40 grams of 2-ethylhexyl acrylate and neopentyl glycol diacrylate at a rate of 5 ml/minute. After step 1, the rate of pumping contents of Tank I to the Reactor was continued but pumping from Tank II to Tank I was started at a rate of 2.17 ml per minute. (This was termed step 2.) At the beginning of step 2: Tank II contained 97.5 grams of styrene, 32.5 grams of acrylonitrile and 1.2 grams of neopentyl glycol diacrylate; and Tank I contained 100 grams of 2-ethylhexyl acrylate and 3.0 grams of neopentyl glycol diacrylate.

In Stage II, after Tanks I and II had emptied, they were refilled with Tank II containing 97.5 grams of styrene and 32.5 grams of acrylonitrile. The contents of Tank II were pumped from Tank II to Tank I at a rate of 3.5 ml per minute. Tank I was refilled with 100 grams of 2-ethylhexyl acrylate and 3.0 grams of neopentyl glycol diacrylate. The contents of Tank I were pumped at a rate of 5 ml per minute from Tank I to the Reactor.

After the tanks were emptied, 100 grams of an admixture of 75 parts of styrene and 25 parts of acrylonitrile were pumped to the Reactor at a rate of 5 ml per minute. The reaction was continued for one hour at 80° C. after monomer addition was complete. Conversion monomers to polymers was essentially complete. The polymer composition had 60 percent of a hard matrix having a 75 to 25 ratio of styrene to acrylonitrile and 40 percent of an elastomeric segment of 2-ethylhexyl acrylate, acrylonitrile and styrene, plus 1.4 percent of neopentyl glycol diacrylate (based on the total monomers). It was recovered by coagulation, washing, filtration and drying at 85° to 90° C.

The polymer was termed polymer composition no. 7.

Polymer composition no. 7 was compounded with poly (vinyl chloride) and stabilizer on a two-roll mill for 7 minutes at 160° C. The compound mill stock contained 7.5 grams of polymer composition no. 7, 75 grams of the same vinyl chloride monopolymer and 1.12 grams of Van Stay HT. On the mill, fluxing, banding, roll release and hot strength were judged good. The mill stock so prepared was molded into one-eigth inch thick bars for Izod Impact determination at 180° C. and 15 psi. In replicate determinations of Izod Impact values of 3.32 and 3.35 ft. lbs/in.$^2$, respectively, were obtained. The 264 psi ASTM heat distortion temperature of this composition was 72° C.

EXAMPLE 6

The procedure used was similar to that of Example 1. The Reactor was charged with 500 grams of water, 3.75 grams of Aerosol OT and 1.56 grams of ammonium persulfate. The reactor temperature was 80° C.

In Stage I, Tank II contained 75 grams of styrene and 25 grams of acrylonitrile. Tank I contained 125 grams of 2-ethylhexyl acrylate and 3.75 grams of neopentyl glycol diacrylate. Twenty-five grams were fed from Tank I to the Reactor at 5 ml/minute before the pumping from Tank II to Tank I was started at 1.67 ml/minute.

In State II, Tank II contained 75 grams of styrene and 25 grams of acrylonitrile. Tank I contained 100 grams of 2-ethylhexyl acrylate and 3.0 grams of neopentyl glycol diacrylate.

The final feed was 56.25 grams of styrene and 18.75 grams of acrylonitrile. The composition had 55 percent of a hard matrix having a 75 to 25 ratio of styrene to acrylonitrile and 45 percent of an elastomeric segment of 2-ethylhexyl acrylate, acrylonitrile and styrene, plus 3 percent of neopentyl glycol diacrylate (based on the acrylate). It was recovered and dried, following coagulation and washing.

The polymer was termed polymer composition no. 9.

EXAMPLE 7

Mill stock (using polymer composition no. 9) was prepared on a two-roll mill at 160° C. for 7 minutes. Milling behavior of the composition was judged to be good. The mill stock had a composition of 7.5 grams of polymer composition no. 9, 75 grams of the same vinyl chloride homopolymer of Example 2 and 1.12 grams of Van Stay HT. The mill stock was molded as one-eigth thick bars at 180° C. and 1500 psi for 5 minutes. Replicate determinations of the Izod Impact value of these one-eigth inch thick bars were 3.39 and 3.34 ft. lbs./in.$^2$, respectively. The 264 psi ASTM heat distortion temperature of this composition in replicate determinations was 75° C.

EXAMPLE 8

A poly (vinyl chloride) homopolymer, having viscosity in the range of 0.61 to 0.65, an Izod Impact of 0.5 ft. lbs./in. and a 244 psi heat distortion temperature of 71° C., and polymer composition no. 9 were milled together on a two-roll mill. The mill stock produced contained 7.5 grams of polymer composition no. 9, 75 grams of this polyvinyl chloride resin and 1.12 grams of Van Stay HT. Milling behavior was judged to be good. The mill stock was molded to produce one-eigth inch thick bars. The Izod Impact value in replicate samples were 1.38 and 1.55 ft. lbs./in.$^2$, respectively. The 264 psi heat distortion temperature was 71° C. In addition, these bars (molded at 180° C. and 1500 psi for 5 minutes) were relatively clear, compared with many known impact-modified systems.

EXAMPLE 9

Impact results of various ASA materials and other materials in the same vinyl chloride homopolymer used in Example 1 at various concentrations are given in Table II. In Table II, A = acrylonitrile, S = styrene, EHA = 2-ethylhexyl acrylate and BA = n-butyl acrylate. The composition contained 75 parts of the same vinyl chloride homopolymer, 1.1 parts of Van Stay HT and the amount of ASA material, or other material, indicated in Table II. The ASA material and other material were prepared by the improved technique described in Example 1.

Table II shows the importance of using an ASA impact modifier of this invention at a concentration of 3 to 15 percent in order to obtain good impact properties.

TABLE II
COMPARISON OF VARIOUS IMPACT MODIFIERS FOR PVC

| ASA and Other Material Tested | % Hard Matrix/Elastomer | Parts of Hard Matrix/Elastomer Used In PVC | Izod Impact, Ft. lbs./In.$^2$ |
|---|---|---|---|
| Vinyl chloride homopolymer of Example 1 | — | — | 1.0 |
| P.C. No. 1[1] | 50 (25A/75S)[2]/50 EHA | 3.75 | 2.9 |
|  |  | 7.5 | 3.3 |
|  |  | 8.3 | 4.8 |
|  |  | 11.25 | 2.7 |
|  |  | 7.5 | 3.3 |
| P.C. No. 5 | 55 (25A/75S)/45 EHA | 7.5 | 4.9 |
| P.C. No. 9 | 55 (25A/75S)/45 EHA | 7.5 | 3.3 |
| P.C. No. 7 | 60 (25A/75S)/40 EHA | 7.5 | 3.3 |
| P.C. No. 13 | 60 (25A/75S)/40 EHA | 7.5 | 3.3 |
| P.C. No. 14 | 60 (25A/75S)/40 EHA | 7.5 | 2.8 |
| P.C. No. 15 | 55 S/45 EHA | 7.5 | 1.6 |
|  |  | 22.5 | 0.3 |
| P.C. No. 16 | 60 S/40 EHA | 7.5 | 1.0 |
| P.C. No. 17 | 50 (25A/75S)/50 BA | 7.5 | 1.1 |
| P.C. No. 18 | 40 (25A/75S)/60 EHA | 7.5 | 2.4 |
|  |  | 22.5 | 0.4 |
| P.C. No. 19 | 40 (25A/75S)/60 EHA | 7.5 | 3.1 |

Note:
[1] P.C. is Polymer Composition
[2] The figures in the parentheses are the parts of acrylonitrile and styrene in the hard matrix.

EXAMPLE 10

The effectiveness of the improved ASA compositions of this invention in different grades of PVC is given in Table III. The polyvinyl resin I is a homopolymer having an inherent viscosity in the range of 0.60 to 0.65. The polyvinyl resin II is a PVC homopolymer having an inherent viscosity in the range of 0.98 to 1.02. PVC resin III is an ethylene-modified poly(vinyl chloride) copolymer having an inherent viscosity in the range of 0.66 to 0.70. The milled stock was formulated using 75 parts of the specified PVC indicated, 1.1 parts of Van Stay HT and 7.5 parts of the specific improved impact modifier of this invention.

TABLE III
COMPARISON OF EFFECTIVENESS OF ASA COMPOSITIONS AS PVC IMPACT BUILDERS—IZOD IMPACT AT 73° C.

| ASA Composition[1] | PVC Resin I | PVC Resin II | PVC Resin III |
|---|---|---|---|
| — | 0.5 | 1.0 | 0.79 |
| P.C. No. 1[2] | — | 3.3 | 2.1 |
| P.C. No. 7 | — | 3.3 | 1.3 |
| P.C. No. 13 | — | 3.3 | 1.4 |
| P.C. No. 14 | — | 2.8 | 1.0 |
| P.C. No. 9 | 1.45 | 3.3 | 1.5 |
| P.C. No. 18 | — | 2.4 | 1.5 |

Notes:
[1] Each is within the scope of this invention.
[2] P.C. means Polymer Composition

EXAMPLE 11

Influence of Impact Modifiers for Poly(Vinyl Chloride) on Brittleness Temperature While the glass transition of poly(vinyl chloride) is generally in the range of 70° to 80° C., depending on polymerization temperature, the brittleness temperature of PVC measured by an impact test such as ASTM-D-746 is in the range of 0° to −5° C. (3). ASA compositions of this invention used impact modifiers for PVC, have reduced the brittleness temperature of the PVC blend to the range of −20° C.

Polymer composition no. 19 was prepared using a procedure similar to that described in Example 1, and contained 60 percent of 2-ethylhexyl acrylate (containing 3 percent of NPGDA) and 40 percent of a 75/25 mixture of styrene and acrylonitrile.

Polymer composition no. 20 was prepared using a procedure similar to that described in Example 1 and contained 50 percent of 2-ethylhexyl acrylate containing (3 percent of NPGDA) and 50 percent of a 75/25 mixture of styrene and acrylonitrile.

The brittleness temperature of the materials resulting from blending of certain ASA compositions with PVC resin III are given in Table IV.

TABLE IV
IZOD IMPACT AND BRITTLENESS TEMPERATURE OF PVC BLENDED WITH MINOR AMOUNTS OF ASA COMPOSITIONS*

| Modifier | Izod Impact, ft. lbs./in. | Brittleness Temperature, ° C. |
|---|---|---|
| P.C. No. 1 | 2.1 | −21 |
| P.C. No. 7 | 1.3 | −21 |
| P.C. No. 13 | 1.4 | −15 |
| P.C. No. 9 | 1.5 | −19 |
| P.C. No. 19 | 3.4 | −25 |
| P.C. No. 20 | 2.1 | −26 |

Note:
*Each PVC composition contained 150 grams of PVC Resin III, 15 grams of ASA of this invention and 2.24 grams of Van Stay HT.

COMPARATIVE EXPERIMENT A

Two samples of commercially available ASA resins (acrylonitrile/styrene/acrylate elastomer) were obtained, namely "Luran-S-757R" and "Luran-A-776-S". Analyses showed these "Lurans" resins had the compositions:

|  | Luran-S 757-R | Luran-S 776-S |
|---|---|---|
| Styrene, percent by weight | 57 | 52 |
| Acrylonitrile percent by weight | 25 | 24 |
| n-butyl acrylate, percent by weight | 18 | 24 |

Both were received as opaque, slightly yellowish white pellets. The two materials were readily milled and molded into plaques. In preparation of test bars, some degree of lamination was observed initially. Later samples were held at molding temperature for a longer period and well fused test bars resulted. Mechanical characteristics are given below:

| MECHANICAL CHARACTERISTICS OF "LURAN-S" | | |
|---|---|---|
|  | "Luran-S-757R" | "Luran-S-776" |
| Room Temperature Stiffness (Secant Modulus) | 115,000 psi | 110,000 psi |
| Tensile Strength | 5,000 psi | 4,500 psi |
| Elongation | 55% | 20% |
| Yield Stress | 5,700 psi | 5,500 psi |
| Elongation at Yield | 6% | 6% |
| Izod Impact, ft. lb./in.$^2$ | 1.8 | 3.3 |
| Heat Distort. Temperature, 264 psi | 88° C. | 90° C |

These values differ from trade literature available, where the following values are listed and may refer to other commercially available grades of "Luran" resin:

| "Luran-S" Plastic"-"British Plastics Materials Guide" | |
|---|---|
| Tensile Strength | 6250 to 7500 psi |
| Elongation at Break | 15 to 20% |
| Izod Impact | 7 ft. lbs./in.$^2$ |
| Heat Distortion Temperature, 264 psi | 102° to 106° |

Materials of the ASA type of our invention are different from the tested "Luran" samples principally in two ways: our improved ASA compositions are translucent or clear, rather than opaque; and generally the low temperature transition observed in the loss modulus is much broader in our materials.

EXAMPLE 12

High acrylonitrile content acrylonitrile-methyl methacrylate-acrylate (AMA) materials were prepared by procedures similar to those described in Example 1 to obtain another PVC impact modifier for comparison purposes.

The emulsions polymerizations were conducted at 80° C. The initial reactor charge was 500 ml of water, 3.0 grams of Aerosol OT and 1.25 grams of $(NH_4)_2S_2O_8$. The polymerizations were achieved by the procedure of Example 1. The total monomer charge in each case was 400 grams. The initial feed was 20 grams of 2-ethylhexyl acrylate in Tank I. The final feed was methyl methacrylate/acrylonitrile. About 3 percent of neopentyl glycol diacrylate, based on the acrylate ester, was also used.

The content of the AMA materials is given in Table V:

TABLE V

| Product No. | Hard Matrix/ Elastomer | Methyl Methacrylate/ Acrylonitrile |
|---|---|---|
| 22 | 60/40 | 30/70 |
| 23 | 70/30 | 40/60 |
| 24 | 70/30 | 30/70 |

Products 22 to 24 were formed into molded plaques which were clear and relatively stiff at room temperature.

These high acrylonitrile content AMA compositions, unlike the ASA materials of this invention, are not effective impact builders (modifiers) for PVC. See Table VI below:

TABLE VI

"AMA" COMPOSITIONS IN COMBINATION WITH PVC

| PVC Resin No. | AMA Sample No. | Izod Impact Ft. Lbs./In.$^2$ |
|---|---|---|
| III | 20 | 0.41 |
| II | 20 | 0.50 |
| III | 22 | 0.40 |
| II | 22 | 0.43 |
| III | 23 | 0.35 |
| II | 23 | 0.43 |
| II | No AMA Modifier | 1.0 |
| III | No AMA Modifier | 0.8 |

The PVC compositions contained 75 parts of PVC, 7.5 parts of AMA and 1.12 parts of Van Stay HT.

What is claimed is:

1. A poly(vinyl chloride) resin composition comprised of an admixture of poly(vinyl chloride) resin and a clear or translucent polymeric material comprised of a non-uniform copolymer of acrylonitrile, styrene, and acrylate, said mixture containing from 3 to 15 percent by weight based on said admixture, of said clear or translucent polymeric material having a weight ratio of an acrylonitrile-styrene hard matrix to an acrylonitrile-styrene-acrylate elastomer segment which is between about 40 to 60 and about 60 to 40, and said nonuniform polymer having been prepared by the process which comprises: introducing at least one primary polymerizable feed composition, selected from the group of monomers consisting of styrene, acrylonitrile, acrylate and a mixture of two or more such monomers, from at least one primary feed source to a polymerization zone, said primary polymerizable feed composition continually varying in compositional content of the polymerizable reactants therein during said continuous introduction; simultaneously adding to said primary feed source at least one different secondary polymerizable feed composition, selected from the group of monomers consisting of styrene, acrylonitrile, acrylate and a mixture of two or more of such monomers, from at least one secondary feed source so as to continually change the compositional content of the polymerizable reactants of said primary polymerizable feed composition in said primary feed source; and continuously polymerizing the primary polymerizable feed composition introduced to the polymerization zone until the desired polymerization has been achieved, said primary polymerizable feed composition being different from said secondary polymerizable feed composition.

2. A poly(vinyl chloride) resin composition of claim 1 wherein said clear or translucent polymeric material is in latex form and wherein said poly(vinyl chloride) resin is in latex or suspension form.

3. A poly(vinyl chloride) resin composition of claim 1 wherein said clear or translucent polymeric material is in dry powder form and wherein said poly(vinyl chloride) resin is in dry powder form.

4. A poly(vinyl chloride) resin composition of claim 1 wherein said admixture also contains a stabilizer, a pigment and at least one other conventional poly(vinyl chloride) resin composition additive.

5. A poly(vinyl chloride) resin composition of claim 1 wherein the weight ratio of said acrylonitrile to said styrene is about 1 to 3.

6. A process which comprises hot processing or fabricating the dry poly(vinyl chloride) resin composition of claim 6.

* * * * *